Figure 1A:
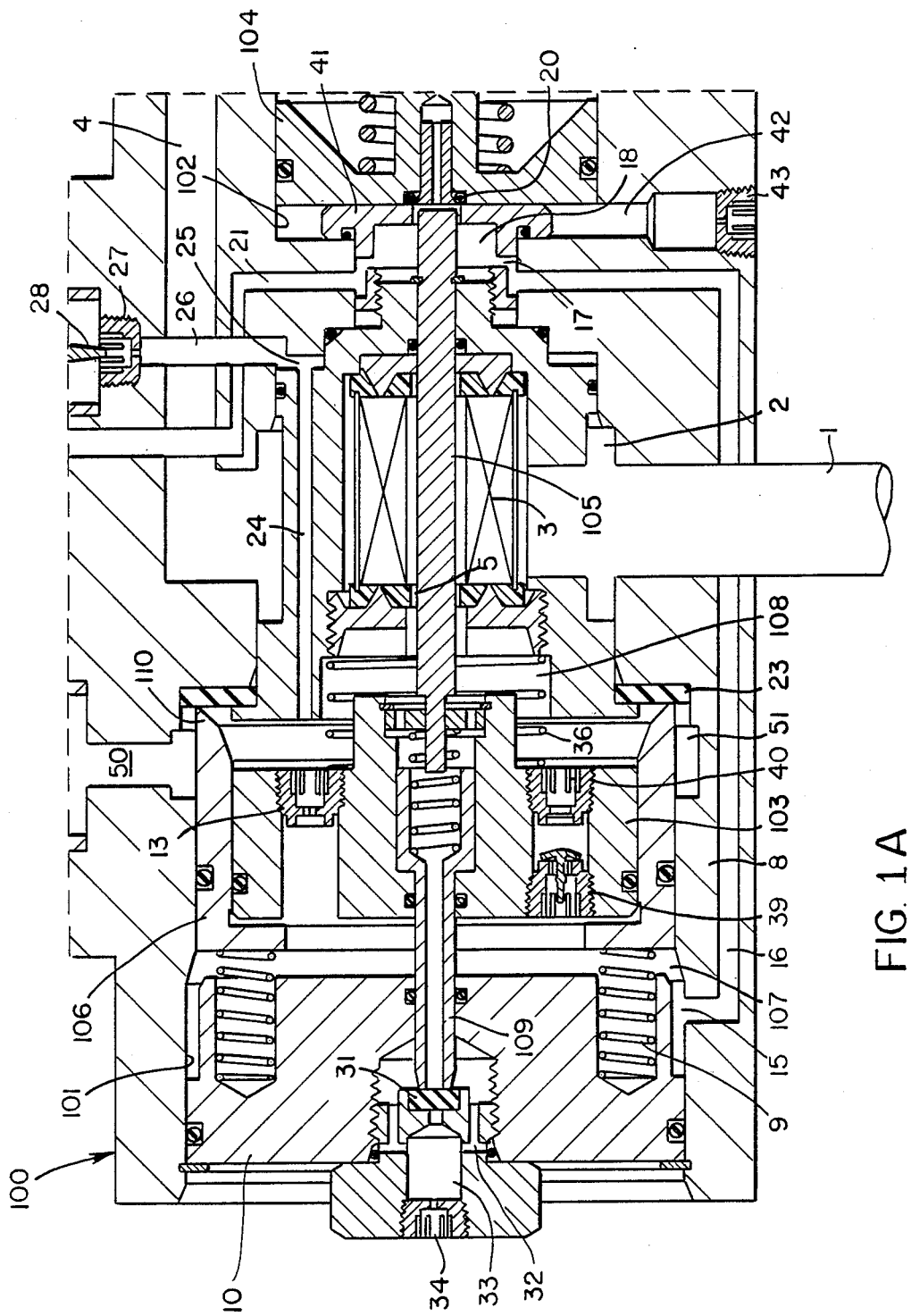

United States Patent [19]

Vaughn et al.

[11] Patent Number: 4,842,341
[45] Date of Patent: Jun. 27, 1989

[54] BRAKE PIPE PRESSURE MODULATING VALVE DEVICE

[75] Inventors: Lawrence E. Vaughn; Walter E. Rojecki, both of Watertown; Thomas H. Engle, Cape Vincent, all of N.Y.

[73] Assignee: General Signal Corporation, Stamford, Conn.

[21] Appl. No.: 192,966

[22] Filed: May 12, 1988

[51] Int. Cl.[4] .............................................. B60T 15/22
[52] U.S. Cl. ........................................ 303/37; 303/82
[58] Field of Search ........................ 303/33, 36, 37, 38, 303/39, 66, 69, 72, 82

[56] References Cited

U.S. PATENT DOCUMENTS

| 2,994,565 | 8/1961 | McClure et al. | 303/82 |
| 4,002,375 | 1/1977 | Weber, Jr. | 303/33 |
| 4,025,126 | 5/1977 | Wilson | 303/33 |
| 4,108,501 | 8/1978 | Hinter et al. | 303/82 |

Primary Examiner—Duane A. Reger
Attorney, Agent, or Firm—Robert R. Hubbard; Harold S. Wynn

[57] ABSTRACT

A modulation valve device for governing pressure in a brake pipe has coaxial accelerating and releasing valves provided wherein accelerated application and release pistons are dovetailed together to reduce the size and the weight of the modulating device.

17 Claims, 4 Drawing Sheets

BRAKE PIPE PRESSURE MODULATING VALVE DEVICE

BACKGROUND

This invention relates to brake pipe pressure modulating valve devices and more particularly relates to an improved modulation valve device that is simplified by combining application and release propagation signal generating valves coaxially in coaxial stepped bores of a housing.

To minimize time requirement for air brake application and release of a train, it is required that modulating valves be provided, particularly on long railway cars for sensing brake control pressure changes in a brake pipe and locally enhancing the signals for faster propagation of the control signals in a brake pipe of a railway train. This is accomplished at present, for example, by A-1 relay devices having respective accelerating and releasing application valves secured by a pipe bracket at an intermediate point between brake control valve devices. Another such device is disclosed in the U.S. Pat. No. 4,653,812, to Engle granted Mar. 31, 1987, in which several separate valves are required. This patent discloses separate accelerating application and accelerating release valves, but is still much too large and heavy for use on a railway car.

An object of the present invention is to provide improved brake pipe pressure modulating apparatus that substantially obviates one or more of the limitations and disadvantages of the described prior systems. Another object of the present invention is to provide an improved modulating valve device that is much lighter and more compact than the prior art systems.

Another object of the present invention is to provide and improved brake pipe pressure modulating valve device that is simplified and less expensive to manufacture than the above described prior art devices.

SUMMARY

A modulated valve device has a housing with first and second end-to-end coaxial stepped bores. The first of the stepped bores contain telescoped accelerated application and accelerated release pistons, together with brake pipe and quick action chamber pressure chambers at opposite ends of the pistons, the same fluid pressure chambers being common to both pistons. The brake pipe chamber is connected to the quick action chamber through a breather choke.

A vent valve piston in the second stepped bore in provided for emergency application signal venting of the brake pipe and is operably connected by a pushrod to the accelerated application piston.

Valves are operably connected to the three pistons respectively for providing continuous quick service in response to a service brake application signal, accelerated release after a brake release signal, and the venting of the brake pipe upon sensing an emergency application signal.

For a better understanding of the present invention, together with other and further objects thereof, reference is had to the following description, taken in connection with the accompanying drawing, while its scope will be pointed out in the attending claims.

IN THE DRAWINGS

Figure 1B:
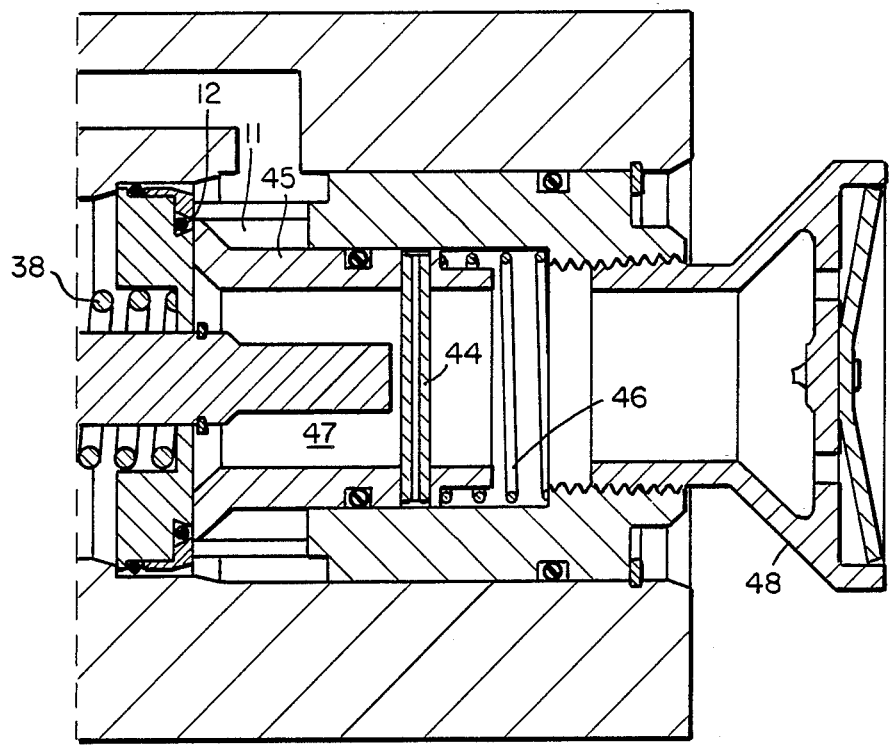
Figure 1C:
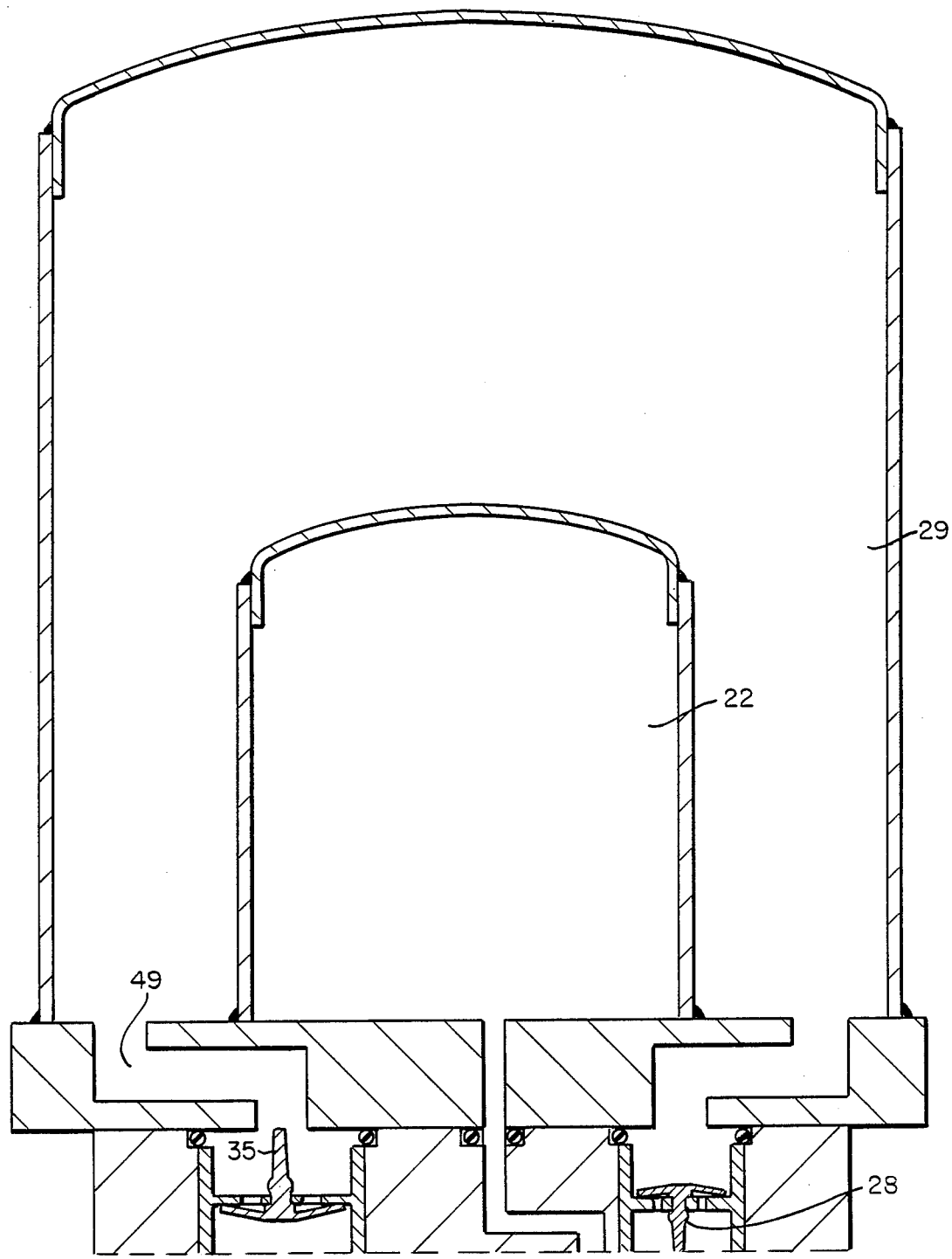
Figure 2:
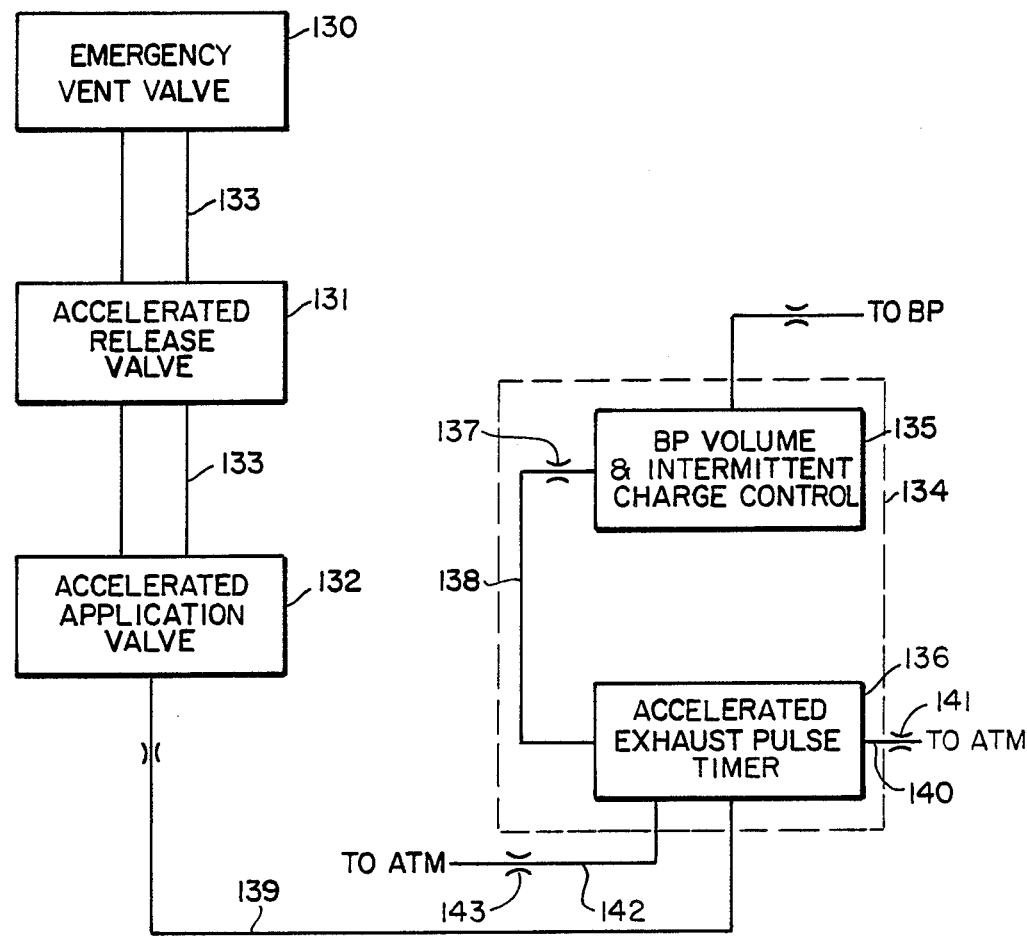

FIGS. 1A and 1B when placed side by side and below FIG. 1C constitute a schematic section drawing of a modulated valve device according to a preferred embodiment of the present invention, and FIG. 2 is a schematic diagram illustrating a modification that can be applied to the embodiment of the invention disclosed in FIGS. 1A, 1B and 1C.

With reference to FIGS. 1A and 1B, a modulation valve device is illustrated as having a housing 100, having first and second coaxial stepped bores 101 and 102 respectively formed therein. An accelerated application piston 103 is provided in the first of the stepped bores 101, and a vent valve piston 104 is disposed in the second stepped bore 102. A pushrod 105 is coaxial with the pistons 103 and 104 and operably connects these pistons. A cup-shaped piston 106 is dovetailed over the accelerated application piston 103, and has an opening in the bottom thereof forming a part of quick action chamber 107 at the left hand end of pistons 106 and 103, the right hand ends of the pistons 103 and 106 being exposed to brake pipe pressure in a brake pipe chamber 108. Various springs are provided for graduating operation of the pistons 103, 104 and 106 as will be more readily apparent as the description progresses relative to consideration of the mode of operation of the modulation valve device.

A spool valve 109 is coaxial with the accelerated application piston 103 and is operable thereby to provide a continuous quick service release of brake pipe fluid to atmosphere for service brake application as will be hereinafter considered. The accelerated release piston 106 has an annular valve 110 at its right hand end for accelerating release of a brake application by venting fluid to the brake pipe chamber 108 and from there to the brake pipe 1. The vent valve piston 104 is operably connected to annular vent valve 45 for releasing fluid from the brake pipe at a rapid rate upon sensing an emergency application signal in the brake pipe 1.

Having thus considered the general organization of a modulation valve device of FIGS. 1A and 1B, further detail will now be considered relative to the normal mode of operation of the system.

OPERATION

DRY CHARGE

As air pressue in a train line brake pipe is increased from a locomotive it flows via the modulating valve branch pipe 1 to annular port 2 where it is distributed to filter 3 and passage 4. After passing through the filter 3, brake pipe air is directed via annular port 5 to brake pipe fluid pressure chamber 108 at the right hand end of pistons 103 and 106, causing the accelerated application piston 103 to move to the left where it contacts accelerated release piston 106. A further increase of pressure in the chamber 108 increases the force across accelerated application piston 7 causing it to move further to the left against the combined force of spring bank 9 until contact is made with combined end cap and piston stop 10. Although this action moves accelerated released piston 8 away from the valve seat 23, air is not allowed to flow in either direction between brake pipe or the accelerated release volume 29 as brake pipe pressure is higher than pressure in the volume 29 holding a back flow check valve 35 (see FIG. 1C) closed cutting off this communication. Fluid from the brake pipe 1 also flows through passage 4 to annular chamber 11 on the outer face of vent valve 45 where it is stopped by seal 12.

At the same time, brake pipe fluid passes through quick action breather choke 13 from brake pipe chamber 108 to chamber 107 on the left hand side of accelerated application piston 103 and through annular port 15, passage 16, annular port 17 to chamber 18 and to the face of vent valve pilot piston 104 where it is stopped by a seal 20. Brake pipe fluid also continues from annular port 17 by way of passage 21 to quick action chamber 22 (see FIG. 1C). As quick action chamber pressure approaches the pressure of the brake pipe 1, spring bank 9 forces accelerated release piston 106 and accelerated application piston 103 to the right, closing the accelerated release valve 110 against seat 23.

During charging, brake pipe fluid also flows from chamber 108 through passage 24, chamber 25 and passage 26 through reservoir charging choke 27 to the underside of accelerated release volume charging check valve 28, creating a pressure differential which opens check valve 28 allowing the accelerated release volume to be charged to brake pipe pressure.

CONTINUOUS QUICK SERVICE AND SERVICE BRAKE APPLICATION

As brake pipe pressure is reduced by means of a locomotive brake valve, or similar device, fluid flows from the modulating valve branch pipe 1 causes a reduced pressure on the face of accelerated application piston 103 in chamber 108, causing a pressure differential across the quick action breather choke 13 causing fluid from the quick action chamber to flow to the brake pipe. If the brake pipe pressure is being reduced at a rate exceeding the rate of drop of quick action chamber pressure, the pressure differential across the accelerated application piston 103 increases until the the force of a biasing spring 36 is overcome, at which time the accelerated application piston 103 moves to the right, taking with it accelerated application spool valve 109. This movement continues until accelerated application piston 103 contacts pushrod 105 which is held stationary by vent valve spring 38.

When open, the accelerated application spool valve 109 allows brake pipe fluid to exhaust to atmosphere at a controlled rate via open check valve seat 31, passage 32, chamber 33 and exhaust choke 34. Because of an area differential across accelerated application piston 103, and bias of spring 36, a differential of nominally one-half psi. is required between brake pipe and quick action chambers 108 and 107 respectively before the accelerated application valve can move to a service position. Once in the service position, accelerated application piston 103 and accelerated application spool valve 30 will not move again until the reduction of brake pipe at a locomotive has been terminated, at which time brake pipe pressure and quick action chamber pressure are equal by way of quick action breather choke 13 returning the accelerated application piston by means of bias spring 36 and the aforementioned area differential to the release positoin, cutting off the flow of brake pipe air to atmosphere. This action at the accelerated application valve assists the reduction of brake pipe pressure by venting pressure continuously at a rate of approximately ¼ psi. per second as long as the brake pipe pressure is being reduced by the locomotive.

ACCELERATED EMERGENCY BRAKE APPLICATION

At the onset of an emergency brake application the accelerated application valve responds as described for service application until a rate of brake pipe pressure drop of nominally 1 psi. per second is exceeded, at which time quick action exhaust check valve 39 opens, due to a pressure differential between brake pipe and quick action chamber pressure, allowing quick action fluid to flow to the brake pipe 1 via quick action exhaust check valve 39 and exhaust breather choke 40. This operation reduces the sensitivity of the emergency vent valve 45 which prevents the vent valve 45 from opening until an predetermined rate of brake pipe drop of nominally 18 psi. per second is exceeded. Once the proper rate of brake pipe pressue drop is reached, there is sufficient pressure differential across accelerated application piston 103 to start to compress emergency sensitivity spring 38 by means of pushrod 105 and emergency pilot piston 104. As the emergency pilot piston 104 moves to the right, seal 20 becomes out of contact with combined filter housing retainer and seat 41, allowing quick action blow down choke 43. As chamber 42 is charged by quick action fluid it cannot escape rapidly enough through choke 43, resulting in the development of a back pressure in chamber 42 which moves the emergency pilot piston 104 to the right further compressing emergency sensitivity spring 38. Once a small dead band has been crossed, the emergency pilot piston contacts actuating pin 44, which allows vent valve 45 to be moved against vent valve return spring 46. Moving vent valve 45 away from seal 12 allows brake pipe fluid to flow through exhaust via large capacity exhaust valve passage 47 and vent protector 48. This operation results in brake pipe pressure being reduced to zero locally at a very rapid rate.

ACCELERATED RELEASE

During a release of a brake application from either a service or emergency application, brake pipe pressure is restored from the locomotive brake valve and is transmitted via the modulating valve branch pipe 1, filter 3, annular port 5 and chamber 6 to the face of accelerated application piston 103. As brake pipe pressure increases above quick action fluid chamber pressure, which following a service application is at brake pipe pressure and following an emergency application is at zero pressure, a pressure differential is developed across accelerated application piston 103 as quick action breather choke 13 limits the amount of air being admitted to chamber 107 at the left hand end of piston 103. Thus piston 103 contacts the bottom end of accelerated release piston 106, moving it to the left and opening accelerated release valve 110 to vent fluid from accelerated release chamber 29 through passage 50 annular chamber 51, brake pipe chamber 108 and filter 3 to brake pipe 1.

As fluid in injected into the brake pipe 1 from the accelerated release volume 29, the local pressure in the brake pipe increases and a pressure wave is transmitted along the brake pipe for signally the release of the brake application. Following a service brake application control valves adjacent to the modulating valves are moved to a release position by the local increase in brake pipe pressure. The pressure wave travels along the brake pipe in order to initiate operation of the next modulating valve and the next service valve along the brake pipe. This operation creates a rapid serial release of the brakes throughout the train. Following an emergency brake application, operation of the modulating valve accelerated release valve 106 assists the locomotive with the recharge of the brake pipe to reduce the time required to release the application.

FIG. 2 MODIFICATION

With reference to FIG. 2, a modified form of the present invention is illustrated wherein an emergency vent valve 130, an accelerated release valve 131 and an accelerated application valve 132 are coaxial with each other and operably connected by pushrods 133 as in the form of the invention illustrated in FIGS. 1A and 1B. In this form, the accelerated application valve 132, rather than having its continuous quick service vented directly to atmosphere, has the quick service signal applied over passage 139 to control a pulsing device 132 for venting the brake pipe to atmosphere as a series of pulses, rather than a steady flow of fluid at a pressure comparable to the rate of flow of fluid from the brake pipe in generating a signal at the locomotive.

The device 132 can be, for example, as is used in the well-known ABDW control vavle in that it has a Brake Pipe Volume and Intermittent Charge Control 135 and an Accelerated Exhaust Pulse Timer 136 that are controlled by an accelerated application signal on passage 139. The application of this signal to the accelerated exhaust pulse timer 136 starts the pulsing, wherein fluid is delivered from brake pipe volume 135, through choke 137 over passage 138 and through Accelerated Exhaust Pulse Timer 136, over passage 140 and through choke 141 to atmosphere. When initiated, the Accelerated Exhaust Pulse Timer 136 delivers an output over passage 142 and through choke 143 to atmosphere that reduces fluid pressure under a piston of the Accelerated Exhaust Pulse Timer to reset the Accelerated Exhaust Pulse Timer to start a new cycle for delivery of another pulse of brake pipe fluid to atmosphere.

Having thus described a brake pipe pressure modulating valve device as a preferred embodiment of the present invention, it is to be understood that various modifications and alterations may be made to the specific embodiment shown without departing from the spirit or scope of the present invention.

We claim:

1. A modulation valve device for facilitating propagation of application and release pressure signals through brake pipe wherein an improved modulation valve device comprises;
   (a) a valve housing having first and second coaxial stepped bores,
   (b) an accelerated application valve piston in the first of the stepped bores and a vent valve piston in the second of the stepped bores,
   (c) a pushrod coaxially operably connecting the accelerated application piston with the vent valve piston,
   (d) a cup-shaped accelerated release piston in the first stepped bore having the accelerated application piston telescoped therewith,
   (e) a quick action fluid pressure and brake pipe fluid pressure chambers formed in the housing that are common to both the accelerated application piston and the accelerated release piston being formed in the first stepped bores at opposite ends of the accelerated application and accelerated release pistons,
   (f) spring biasing means for biasing the accelerated release and accelerated application pistons in opposite directions to each other, and
   (e) valve means governed by the accelerated application and accelerated release pistons for alternately locally reducing and increasing brake pipe pressure for accelerating transmission of pressure signal changes through a brake pipe of a train.

2. A modulation valve device according to claim 1 wherein the housing has a brake pipe port connected to a brake pipe air filter having an axial bore for journaling the pushrod.

3. A modulation valve device according to claim 1 wherein the housing has respective quick action volume and accelerated release volume ports.

4. A modulation valve device according to claim 3 wherein coaxial quick action and accelerated release volumes are connected to the respective quick action volume and accelerated release volume ports.

5. A modulation valve according to claim 1 wherein;
   (a) the accelerated application piston has a breather choke and passageway connecting brake pipe and quick action chambers at opposite ends of the accelerated application piston for permitting controlled equalization of quick action and brake pipe chambers,
   (b) the accelerated application piston having a quick action exhaust check valve, passageway and choke connecting the quick action and brake pipe chambers at opposite ends of the accelerated application piston for permitting quick action fluid to flow through the accelerated action piston to the brake pipe chamber to prevent opening of a vent valve by the vent valve piston until brake pipe pressure has been materially reduced to signal and emergency brake application.

6. A modulation valve device according to claim 5 wherein the pushrod is actuated axially by the accelerated application piston in response to an emergency signal in the brake pipe to first open a valve to blow down the quick action chamber through a blow down choke by initial axial movement of the vent valve piston and to thereafter open the axially operably vent valve to locally vent fluid from a brake pipe at an increased rate to accelerate an emergency brake application signal.

7. A modulation valve device according to claim 6 wherein upon an increase in brake pipe pressure as a signal for brake release, the accelerated application piston senses brake pipe pressure being higher than quick action pressures and moves in the direction of the quick action chamber to actuate the accelerated release valve piston for opening a release valve to apply accelerated release volume fluid to the brake pipe for locally accelerating a brake release signal through the brake pipe.

8. A modulation valve device for facilitating propagation of brake application and release fluid pressue signals through a brake pipe wherein an improved modulation valve device comprises;
   (a) a valve housing having at least one stepped bore,
   (b) combined accelerated application valve and accelerated release valve piston means in the stepped bore having pressure chambers at opposite ends of the piston means for sensing brake pipe and quick action fluid pressures respectively,
   (c) breather choke means connecting the brake pipe and the quick action chambers for charging the quick action from the brake pipe pressure chamber at a limited rate, causing the piston means to move axially in one direction for locally venting fluid from the brake pipe at a controlled rate upon sensing a brake application signal in the brake pipe, and
   (d) spring means acting axially in the opposite direction for causing movement of the piston means to cause the piston means to move in said opposite direction for applying fluid from a charged accelerated release volume to the brake pipe upon sensing a brake release signal in the brake pipe.

9. A modulation valve device according to claim 8 wherein the combined accelerated application and accelerated release piston means has telescoped accelerated application and release pistons, both being actuated by the same brake pipe and quick action pressures in the same common corresponding brake pipe and quick action chambers at opposite ends of the pistons.

10. A modulation valve device according to claim 9 wherein the housing has respective quick action and accelerated release volume ports.

11. A modulation valve device according to claim 10 wherein the housing has coaxial quick action and accelerated release volumes attached thereto at the quick action and accelerated release volume ports.

12. A modulation valve device according to claim 9 wherein the accelerated application piston has a breather choke and passageway connecting the brake pipe and quick action chambers at opposite ends of the accelerated application piston for permitting equalization of the brake pipe and quick action chambers only at a limited rate.

13. A modulation valve device according to claim 12 wherein the breather choke limits fluid flow from the brake pipe chamber to the quick action chamber to substantially the same rate of pressure reduction as in a brake pipe signal generated in a locomotive for a service brake application signal.

14. A modulation valve device according to claim 9 wherein the quick action chamber is connected to the brake pipe chamber through a quick action exhaust check valve to require a substantial reduction in a brake pipe reduction signal before sensing and emergency application signal.

15. A modulation valve device according to claim 8 wherein cycling means is provided for quick action cycling release of continuous quick service fluid for accelerating propagation of a service application signal through a brake pipe.

16. A modulation valve device according to claim 15 wherein the cycling means as charging valve means having an exhaust rate volume or timing the duration of exhaust cycles.

17. A modulation valve device according to claim 16 wherein the cycling means has an exhaust valve for initiating and termination cycling by the charging means.

* * * * *